United States Patent
Lin et al.

(10) Patent No.: US 6,650,904 B1
(45) Date of Patent: Nov. 18, 2003

(54) OPTIMIZATION OF RADIO RECEIVER UPLINK POWER

(75) Inventors: Zongde Lin, Frisco, TX (US); Dongjie Huang, Richardson, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/465,442

(22) Filed: Dec. 16, 1999

(51) Int. Cl.[7] .............................. H04B 7/00; H04Q 7/20
(52) U.S. Cl. .......................................... 455/522; 455/69
(58) Field of Search ........................... 455/522, 69, 70, 455/63, 67.1, 67.3, 561, 13.4, 517, 501, 504, 63.1, 67.11, 67.13, 130, 232.1, 352, 226.1

(56) References Cited

U.S. PATENT DOCUMENTS

| 5,566,165 A | * | 10/1996 | Sawahashi et al. | ......... 370/342 |
| 5,669,066 A | * | 9/1997 | Borg et al. | ............... 455/69 |
| 6,212,364 B1 | * | 4/2001 | Park | ........................... 455/522 |

FOREIGN PATENT DOCUMENTS

| DE | 198 21 519 | 11/1999 |
| EP | 1 054 517 | 11/2000 |

OTHER PUBLICATIONS

Wen J –H et al: "Performance of Short–Term Fading Prediction–Based Power Control Method for DS–CDMA Cellular Mobile Radio Networks" IEICE Transactions on Communications, Istitute of Electronics Information and Comm. Eng. Tokyo, JP, vol. E81–B, No. 6, Jun. 1, 1998, pp. 1231–1237, XP000788971 ISSN: 0916–8516 p. 1232, right hand column, paragraph 9—p. 1233, left–hand column, paragraph 2.

* cited by examiner

Primary Examiner—Dwayne Bost
Assistant Examiner—Eliseo Ramos-Feliciano
(74) Attorney, Agent, or Firm—Roger S. Burleigh

(57) ABSTRACT

Methods for optimizing an uplink power window associated with a radio receiver, wherein the uplink power window is defined by upper ($P_U$) and lower ($P_L$) power levels. In an exemplary embodiment, the method includes the steps of: i) determining a carrier signal strength (C) and an interference level (I); ii) calculating a carrier-to-interference ratio (C/I); iii) comparing the carrier-to-interference ratio (C/I) to a predefined target value; and iv) if the carrier-to-interference ratio (C/I) is less than the predefined target value, increasing the size of the uplink power window, otherwise, if the carrier-to-interference ratio (C/I) is greater than the predefined target value, decreasing the size of the uplink power window. By using the methods of the present invention, the uplink power window of a radio receiver can be dynamically-adapted to effectively minimize uplink interference while maintaining satisfactory quality of service.

24 Claims, 1 Drawing Sheet

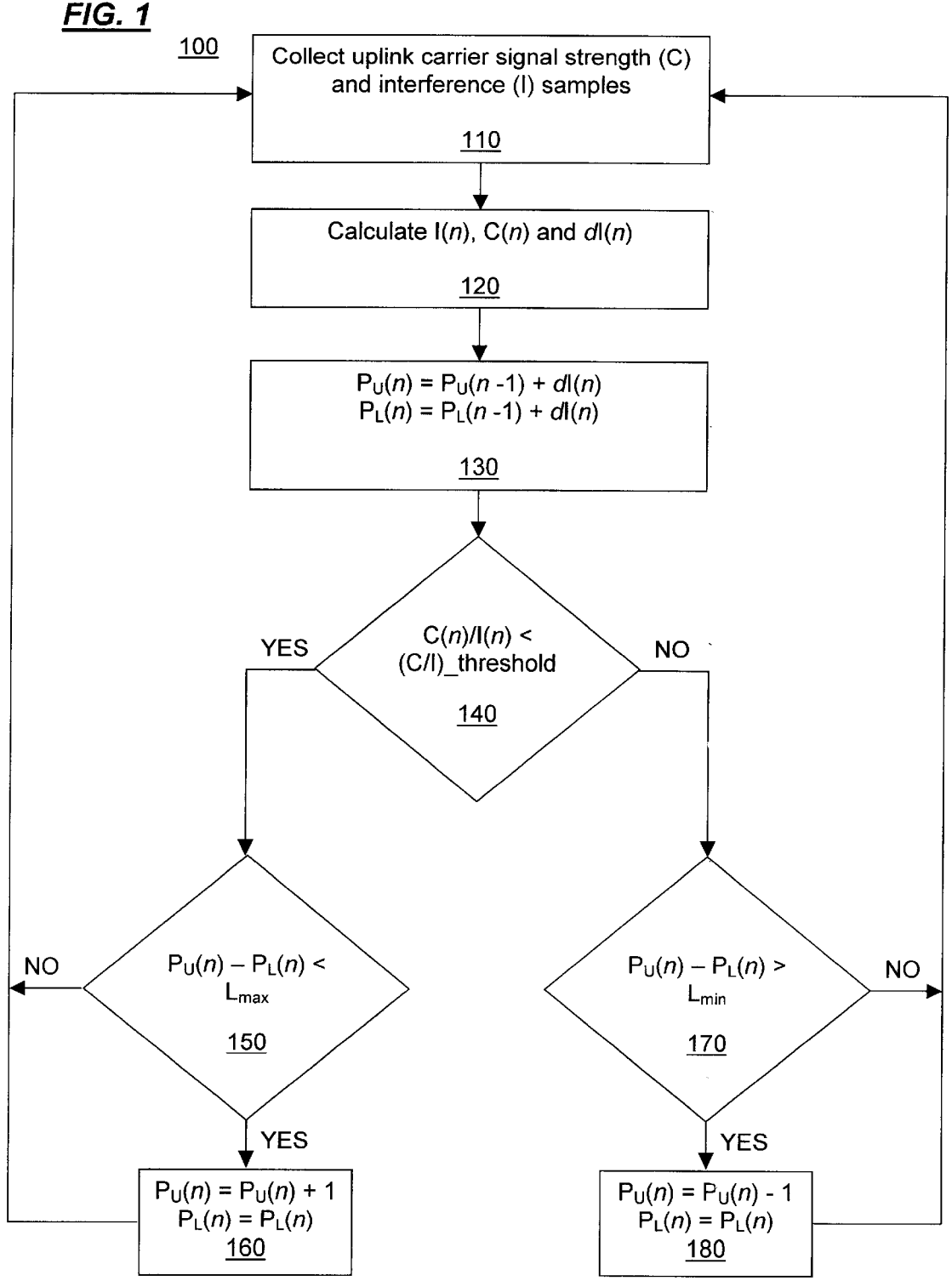

OPTIMIZATION OF RADIO RECEIVER UPLINK POWER

TECHNICAL FIELD OF THE INVENTION

The present invention is directed, in general, to wireless communications systems and, more specifically, to methods for optimizing an uplink power window associated with radio receivers.

BACKGROUND OF THE INVENTION

In a wireless communication system, an "uplink" is a radio path (channel or link) over which a transmitter, such as in a Mobile Station (MS) sends encoded voice or signaling information to a radio base station (RBS) using modulated radio signals. Field observations have shown that interference levels at a cell level in a radio network are not static, but vary due to changes in the traffic load throughout a day, and from day to day. A high interference level during peak traffic periods statistically results in a low carrier-to-interference (C/I) ratio at a system level if all MSs transmit at a constant power level. A low C/I ratio directly results in degradation of network performance whenever the interference level in the system is increased.

A radio receiver has an uplink power window that defines upper and lower limits of received signal strength; i.e., a received signal must be within the uplink power window to be processed by the receiver. The uplink power window is designed to guide transmitters, such as in a MS, to transmit at an optimal power level that ensures a reliable radio link and a minimum disturbance to co-channels. In conventional wireless communications networks, the uplink power window for a Base Transceiver Station s (BTS) in each cell is defined by the system operator. Current implementations of uplink power window regulation require the system operator to manually define upper and lower limits of the power window for each cell. Once defined, the size and the lower baseline of an uplink power window are fixed, regardless of how the RF environment changes in each cell. If the strength of a received signal is outside the uplink power window, the BTS notifies the MS to adjust its transmit power level so that the received signal strength is expected to fall within the uplink power window.

There are several disadvantages to the use of a fixed uplink power window. First, the uplink power window can not be adaptively adjusted in response to changes in the RF environment. Second, manual adjustment of the uplink power window for each BTS in a cellular system requires extensive labor, resulting in increased operation and maintenance expenses. Furthermore, manual adjustment of the uplink power window can not provide an optimal adjustment, because any fixed uplink power window setting necessarily neglects short-term RF variations such as increased interference levels during peak traffic periods.

Accordingly, there is a need in the art for methods to optimize a radio receiver uplink power window. Preferably, such methods should be responsive to slow or fast variations in interference levels, and should be readily adaptable to implementation in the existing architecture of wireless communications systems.

SUMMARY OF THE INVENTION

To address the above-discussed deficiencies of the prior art, the present invention relates to methods for optimizing an uplink power window associated with a radio receiver, wherein the uplink power window is defined by upper ($P_U$) and lower ($P_L$) power levels. The methods disclosed herein provide an adaptive method of adjusting an uplink power window in order to effectively minimize uplink interference while maintaining satisfactory quality of service.

In an exemplary embodiment, the method comprises the basic steps of: i) determining a carrier signal strength (C) and an interference level (I); ii) calculating a carrier-to-interference ratio (C/I); iii) comparing the carrier-to-interference ratio (C/I) to a predefined target value; and iv) if the carrier-to-interference ratio (C/I) is less than the predefined target value, increasing the size of said uplink power window, otherwise, if the carrier-to-interference ratio (C/I) is greater than the predefined target value, decreasing the size of the uplink power window.

In a preferred embodiment, the step of increasing the size of the uplink power window can include the step of increasing the upper ($P_U$) power level; in alternate embodiments, the step of increasing the size of the uplink power Window can include the step of decreasing the lower ($P_L$) power level, or increasing the upper ($P_U$) power level in combination with decreasing the lower ($P_L$) power level. In related embodiments, the step of decreasing the size of the uplink power window can include the step of decreasing the upper ($P_U$) power level; in alternate embodiments, the step of decreasing the size of the uplink power window can include the step of increasing the lower ($P_L$) power level, or decreasing the upper ($P_U$) power level in combination with increasing the lower ($P_L$) power level.

In an exemplary embodiment, the step of determining a carrier signal strength (C) includes the steps of: i) collecting a plurality of sample values of the carrier signal strength over a period (T); and ii) computing the carrier signal strength (C) as a function of the plurality of sample values. The step of computing the carrier signal strength (C) as a function of the plurality of samples can include the step of calculating an average value of the plurality of sample values of the carrier signal ($C_{avg}$) or, alternatively, can include the step of calculating a Cumulative Distribution Function of the plurality of sample values of the carrier signal ($C_{CDF}$). In related embodiments, the step of determining an interference level (I) includes the steps of: i) collecting a plurality of sample values of the interference level (I) over a period (T); and ii) computing the interference level (I) as a function of the plurality of sample values. The step of computing the interference level (I) as a function of the plurality of samples can include the step of calculating an average value of the plurality of sample values of the interference level ($I_{avg}$) or, alternatively, can include the step of calculating a Cumulative Distribution Function of the plurality of sample values of the interference level ($I_{CDF}$).

In some embodiments, the size of the uplink power window can be limited by predefined maximum ($P_{MAX}$) and minimum ($P_{MIN}$) values. In such embodiment;, the step of increasing the size of the uplink power window is preferably bypassed if the size of the uplink power window is equal to the predefined maximum ($P_{MAX}$) value; similarly, the step of decreasing the size of the uplink power window is preferably bypassed if the size of the uplink power window is equal to the predefined minimum ($P_{MIN}$) value.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which:

FIG. 1 illustrates an exemplary method for optimizing an uplink power window associated with a radio receiver.

DETAILED DESCRIPTION

The principles of the present invention can be used to implement an adaptive method of adjusting an uplink power window in order to effectively minimize uplink interference while maintaining satisfactory quality of service. In operation, i a received signal strength is outside the uplink power window, the receiving station, such as a Base Transceiver Station (BTS) in a cellular communications network, notifies the transmitting station, such as a Mobile Station (MS), to adjust its transmission signal strength such that the adjusted signal strength will fall within the uplink power window of the receiving station. The principles of the invention recognize that interference levels in each cell of a wireless communications network usually vary due to variations in traffic load, and provide an intelligent algorithm for handing slow or fast changes in the radio frequency (RF) environment. In exemplary embodiments, the low window baseline of the receiving station is constantly adjusted based on cell level interference measurements, and the size of the uplink power window is adjusted towards an optimal carrier-to-interference (C/I) ratio calculated from real-time measurements.

An algorithm in accordance with the principles of the invention modifies the uplink power window in order to optimize the C/I ratio using real-time traffic measurements such as interference (I) and carrier signal strength (C) as the algorithm inputs. The exemplary algorithm described herein is applicable to both Analog Voice Channel (AVC) and Digital Traffic Channel (DTC) power controls. Samples of interference (I) can be collected by a voice channel when no call is in progress, and samples of carrier signal strength (C) can be collected by a voice channel when a call is in progress.

As used herein, the following definitions are used in describing an exemplary algorithm in accordance with the principles of the invention:

$P_L(n)$: The lower limit of the uplink power window at time n (dBm).

$P_U(n)$: The upper limit of the uplink power window at time n (dBm).

$L_W(n)$: The size of the uplink power window at time n (dB), which is equal to $P_U(n)-P_L(n)$ with a range $L_{min} \leq L_W(n) \leq L_{max}$.

$I_{CDF}(n)$: The value (dBm) which x% of the uplink interference samples collected in the period T are below.

$I_{avg}(n)$: The average uplink interference value (dBm) of all samples collected in the period of T.

$dI(n)$: $I(n)-I(n-1)$ where $I(n)$ can be either $I_{avg}(n)$ or $I_{CDF}(n)$.

$C_{CDF}(n)$: The value (dBm) which y% of carrier signal strength samples collected in the period T is above.

$C_{avg}(n)$: The average uplink carrier signal strength (dBm) of all samples collected in the period of T.

$C(n)/I(n)$: C/I at time n where C and I can be either CDF or average values.

(C/I)_threshold: target C/I value

M: Other fading and quality margin value (dB).

T: The time period during which measurement samples are collected.

Referring to FIG. 1, illustrated is an exemplary method 100 for optimizing an uplink power window associated with a radio receiver according to the principles of the present invention. In Step 110, uplink carrier signal strength (C) and interference (I) samples are collected. In an exemplary embodiment, a sliding window with the duration T is used in real-time to extract measurement samples in the time domain; a duration T is configurable as necessary to capture the traffic characteristics. Next, in Step 120, uplink interference (I) and carrier signal strength (C) are calculated at time n based on measurement samples collected during period T. Both the interference (I) and carrier signal strength (C) values can be CDF values or average values, but both should use the same type of matrix; i.e., if $I(n)=I_{CDF}(n)$, then $C(n)=C_{CDF}(n)$, and if $I(n)=I_{avg}(n)$, then $C(n)=C_{avg}(n)$. The value of $dI(n)$ reflects the fluctuation of the noise floor level between the current time n and n−1.

In Step 130, the variation in the interference level $dI(n)$ is added to the upper and lower levels of the uplink power window at time n−1; i.e., $P_U(n)=P_U(n-1)+dI(n)$, and $P_L(n)=P_L(n-1)+dI(n)$. This ensures that the lower level $P_L(n)$ of the uplink power window is higher than the interference level with a sufficient quality margin. In an exemplary embodiment, lower level of the uplink power window is initially defined as: $P_L(0)=I(0)+(C/I)\_threshold+M$.

Next, in Step 140, C/I at current time n is calculated and compared to the target C/I value (C/I)_threshold. If the current C/I value is less than the target value, processing continues to Step 150; otherwise, if the current C/I value is larger than the target C/I value, processing continues to Step 170. As noted above, the C/I at current time n can be calculated in either of two forms: i.e., $C(n)/I(n)=C_{CDF}(n)/I_{CDF}(n)$ or $C_{avg}(n)/I_{avg}(n)$.

In Step 150, it is determined whether the size of the uplink power window $L_W$ is set to its maximum value $L_{max}$, where $L_W(n)=P_U(n)-P_L(n)$. If the size of the uplink power window is not currently set to its maximum value, i.e., $P_U(n)-P_L(n)<L_{max}$, processing continues at Step 160 for increasing the size of the uplink power window; otherwise, if the size of the uplink power window is currently set to its maximum value, i.e., $L_W(n)=L_{max}$, processing continues at Step 110 to start another processing cycle at time n+1.

In Step 160, the size of the uplink power window is increased. In a preferred embodiment, the size of the uplink power window is increased by increasing the upper level $P_U$; alternatively, the lower level $P_L$ could be decreased. The amount that the upper level $P_U$ is increased, or the lower level $P_L$ is decreased, can be defined to be any value, but is preferably a value substantially less than the maximum size of the uplink power window. As illustrated in Step 160, if the value is selected to be 1 dB, $P_U$ is set equal to $P_U(n)+1$ dB, while the lower level $P_L$ is maintained at the value $P_L(n)$. Processing then continues at Step 110 to start another processing cycle at time n+1.

As noted previously with respect to Step 140, if the current C/I value is larger than the target C/I value, processing continues to Step 170. In Step 170, it is determined whether the size of the uplink power window $L_W$ is set to its minimum value $L_{min}$, where $L_W(n)=P_U(n)-P_L(n)$. If the size of the uplink power window is currently greater than its minimum value, i.e., $P_U(n)-P_L(n)>L_{min}$, processing continues at Step 180 for decreasing the size of the uplink power window; otherwise, if the size of the uplink power window is currently set to its minimum value, i.e., $L_W(n)=L_{min}$, processing continues at Step 110 to start another processing cycle at time n+1.

In Step 180, the size of the uplink power window is decreased. In a preferred embodiment, the size of the uplink power window is decreased by decreasing the upper level $P_U$; alternatively, the lower level $P_L$ could be increased. The amount that the upper level $P_U$ is decreased, or the lower level $P_L$ is increased, can be defined to be any value, but is preferably a value substantially less than the maximum size of the uplink power window. As illustrated in Step 180, if the value is selected to be 1 dB, $P_U$ is set equal to $P_U(n)-1$ dB, while the lower level $P_L$ is maintained at the value $P_L(n)$. Processing then continues at Step 110 to start another processing cycle at time n+1. window.

The present invention provides significant advantages to wireless communications systems, in general, and the invention is particularly advantageous in cellular communications networks. The proposed algorithm is an automatic and adaptive algorithm that can reduce operating and maintenance expenses associated with manual adjustment of uplink power windows for BTS radio receivers, and can result in an optimal adjustment of the uplink power window in order to effectively minimize uplink interference while maintaining satisfactory quality of service.

The general processes, and specific algorithms, described herein can be implemented in any computer-executable software or firmware to configure the processing circuitry of a general or special purpose computer to perform the disclosed functions. When the software or firmware is executed by computer hardware, the computer essentially configures its processing circuitry to perform the functions defined by the software; the computer processing circuitry thereby becomes the "means" corresponding to the claimed means limitations of the claims recited hereinafter. Those of ordinary skill in the art have the skill to select an appropriate conventional computer system and implement the claimed process on that computer system, whether such "computer system" contains general purpose processing circuitry or specific purpose processing circuitry, such as processing circuitry within a wireless communications system radio receiver. Accordingly, the general processes, and specific algorithms, disclosed herein can be used to advantage in any type of radio receiver having an uplink power window, and all such embodiments are intended to be within the scope of the claims recited hereinafter.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for optimizing a radio receiver's uplink power window, said uplink power window defined by upper ($P_U$) and lower ($P_L$) power levels, wherein said radio receiver processes a received signal if the signal strength of said received signal is within said upper ($P_U$) and lower ($P_L$) power levels, said method comprising the steps of:

determining a carrier signal strength (C) of a received signal and an interference level (I) at said radio receiver;

calculating a carrier-to-interference ratio (C/I) at said radio receiver;

comparing the carrier-to-interference ratio (C/I) to a predefined target value; and if the carrier-to-interference ratio (C/I) is less than said predefined target value, increasing the size of said radio receivers uplink power window;

otherwise, if the carrier-to-interference ratio (C/I) is greater than said predefined target value, decreasing the size of said radio receiver's uplink power window.

2. The method recited in claim 1, wherein said step of increasing the size of said uplink power window comprises the step of increasing the upper power level ($P_U$).

3. The method recited in claim 1, wherein said step of decreasing the size of said uplink power window comprises the step of decreasing the upper power level ($P_U$).

4. The method recited in claim 1, wherein the step of determining a carrier signal strength (C) comprises the steps of:

collecting a plurality of sample values of said carrier signal strength over a period (T); and computing said carrier signal strength (C) as a function of said plurality of sample values.

5. The method recited in claim 4, wherein said step of computing said carrier signal strength (C) as a function of said plurality of samples comprises the step of calculating an average value of said plurality of sample values of said carrier signal ($C_{avg}$).

6. The method recited in claim 4, wherein said step of computing said carrier signal strength (C) as a function of said plurality of samples comprises the step of calculating a Cumulative Distribution Function of said plurality of sample values of said carrier signal ($C_{CDF}$).

7. The method recited in claim 1, wherein the step of determining an interference level (I) comprises the steps of:

collecting a plurality of sample values of said interference level (I) over a period (T); and computing said interference level (I) as a function of said plurality of sample values.

8. The method recited in claim 7, wherein said step of computing said interference level (I) as a function of said plurality of samples comprises the step of calculating a Cumulative Distribution Function of said plurality of sample values of said interference level ($I_{CDF}$).

9. The method recited in claim 1, wherein said step of computing said interference level (I) as a function of said plurality of samples comprises the step of calculating an average value of said plurality of sample values of said interference level ($I_{avg}$).

10. The method recited in claim 1, further comprising the step of computing a size of said uplink power window as a function of said upper ($P_U$) and lower ($P_L$) power levels, said step of increasing the size of said uplink power window being bypassed if said size of said uplink power window is equal to a predefined maximum size ($P_{MAX}$), and said step of decreasing the size of said uplink power window being bypassed if said size of said uplink power window is equal to a predefined minimum size ($P_{MIN}$).

11. The method recited in claim 1, further comprising the step of adjusting said lower power level ($P_L$) as a function of said interference level (I).

12. The method recited in claim 11, wherein said step of adjusting said lower power level ($P_L$) comprises the steps of:

collecting a plurality of sample values of said interference level (I) over a period (T);

computing a change in value of said interference level (I) during said period (T); and adjusting said lower power level ($P_L$) by said change in value of said interference level (I).

13. A wireless communications system radio receiver having an uplink power window defined by upper ($P_U$) and lower ($P_L$) power levels, wherein said radio receiver processes a received signal if the signal strength of said received signal is within said upper ($P_U$) and lower ($P_L$) power levels, said radio receiver comprising:

means for determining a carrier signal strength (C) of a received signal and an interference level (I) at said radio receiver;

means for calculating a carrier-to-interference ratio (C/I) at said radio receiver;

means for comparing the carrier-to-interference ratio (C/I) to a predefined target value; and means for i) increasing the size of said radio receiver's uplink power window if the carrier-to-interference ratio (C/I) is less than said predefined target value, and ii) decreasing the size of said radio receivers uplink power window if the carrier-to-interference ratio (C/I) is greater than said predefined target value, whereby the size of said radio receiver's uplink power window is optimized.

14. The radio receiver recited in claim 13, wherein said means for increasing the size of said uplink power window comprises means for increasing the upper power level ($P_U$).

15. The radio receiver recited in claim 13, wherein said means for decreasing the size of said uplink power window comprises means for decreasing the upper power level ($P_U$).

16. The radio receiver recited in claim 13, wherein said means for determining a carrier signal strength (C) comprises means for collecting a plurality of sample values of said carrier signal strength over a period (T), and means for computing said carrier signal strength (C) as a function of said plurality of sample values.

17. The radio receiver recited in claim 16, wherein said means for computing said carrier signal strength (C) as a function of said plurality of samples comprises means for calculating an average value of said plurality of sample values of said carrier signal ($C_{avg}$).

18. The radio receiver recited in claim 16, wherein said means for computing said carrier signal strength (C) as a function of said plurality of samples comprises means for calculating a Cumulative Distribution Function of said plurality of sample values of said carrier signal ($C_{CDF}$).

19. The radio receiver recited in claim 13, wherein said means for determining an interference level (I) comprises means for collecting a plurality of sample values of said interference level (I) over a period (T), and means for computing said interference level (I) as a function of said plurality of sample values.

20. The radio receiver recited in claim 19, wherein said means for computing said interference level (I) as a function of said plurality of samples comprises means for calculating a Cumulative Distribution Function of said plurality of sample values of said interference level ($I_{CDF}$).

21. The radio receiver recited in claim 13, wherein said means for computing said interference level (I) as a function of said plurality of samples comprises means for calculating an average value of said plurality of sample values of said interference level ($I_{avg}$).

22. The radio receiver recited in claim 13, further comprising means for computing a size of said uplink power window as a function of said upper ($P_U$) and lower ($P_L$) power levels, said means for increasing the size of said uplink power window being disabled if said size of said uplink power window is equal to a predefined maximum size ($P_{MAX}$), and means for decreasing the size of said uplink power window being disabled if said size of said uplink power window is equal to a predefined minimum size ($P_{MIN}$).

23. The radio receiver recited in claim 13, further comprising means for adjusting said lower power level ($P_L$) as a function of said interference level (I).

24. The radio receiver recited in claim 23, wherein said means for adjusting said lower power level ($P_L$) comprises:

means for collecting a plurality of sample values of said interference level (I) over a period (T);

means for computing a change in value of said interference level (I) during said period (T); and means for adjusting said lower power level ($P_L$) by said change in value of said interference level (I).

* * * * *